United States Patent
Däschlein et al.

(10) Patent No.: US 10,392,488 B2
(45) Date of Patent: Aug. 27, 2019

(54) METHOD FOR PRODUCING EXPANDED THERMOPLASTIC ELASTOMER PARTICLES

(71) Applicant: BASF SE, Ludwigshafen (DE)

(72) Inventors: Christian Däschlein, Mannheim (DE); Peter Gutmann, Karlsruhe (DE); Jürgen Ahlers, Groß-Rohrheim (DE)

(73) Assignee: BASF SE (DE)

( * ) Notice: Subject to any disclaimer, the term of this patent is extended or adjusted under 35 U.S.C. 154(b) by 232 days.

(21) Appl. No.: 15/028,259

(22) PCT Filed: Oct. 9, 2014

(86) PCT No.: PCT/EP2014/071595
§ 371 (c)(1),
(2) Date: Jun. 1, 2016

(87) PCT Pub. No.: WO2015/052265
PCT Pub. Date: Apr. 16, 2015

(65) Prior Publication Data
US 2016/0297943 A1    Oct. 13, 2016

(30) Foreign Application Priority Data
Oct. 11, 2013  (EP) .................... 13188373

(51) Int. Cl.
| | |
|---|---|
| C08J 9/16 | (2006.01) |
| B29C 44/00 | (2006.01) |
| C08J 9/18 | (2006.01) |
| B29C 44/34 | (2006.01) |
| C08J 9/12 | (2006.01) |
| C08J 9/232 | (2006.01) |
| C08J 9/236 | (2006.01) |
| B29C 44/08 | (2006.01) |
| B29K 9/06 | (2006.01) |
| B29K 19/00 | (2006.01) |

(Continued)

(52) U.S. Cl.
CPC ............... C08J 9/18 (2013.01); B29C 44/08 (2013.01); B29C 44/3415 (2013.01); B29C 44/3453 (2013.01); B29C 44/3461 (2013.01); C08J 9/122 (2013.01); C08J 9/232 (2013.01); C08J 9/236 (2013.01); B29K 2009/06 (2013.01); B29K 2019/00 (2013.01); B29K 2067/00 (2013.01); B29K 2075/00 (2013.01); B29K 2077/00 (2013.01); B29K 2096/04 (2013.01); B29K 2105/0005 (2013.01); B29K 2105/048 (2013.01); B29K 2105/251 (2013.01); B29K 2995/004 (2013.01); B29K 2995/007 (2013.01); B29K 2995/0037 (2013.01); B29K 2995/0039 (2013.01); B29K 2995/0063 (2013.01); C08J 2201/026 (2013.01); C08J 2201/034 (2013.01); C08J 2203/06 (2013.01); C08J 2203/182 (2013.01); C08J 2205/044 (2013.01); C08J 2205/046 (2013.01); C08J 2205/052 (2013.01); C08J 2300/22 (2013.01); C08J 2300/26 (2013.01); C08J 2325/10 (2013.01); C08J 2353/02 (2013.01); C08J 2367/02 (2013.01); C08J 2375/06 (2013.01); C08J 2375/08 (2013.01); C08J 2377/02 (2013.01); C08J 2377/04 (2013.01); C08J 2377/06 (2013.01)

(58) Field of Classification Search
CPC combination set(s) only.
See application file for complete search history.

(56) References Cited

U.S. PATENT DOCUMENTS

| | | | |
|---|---|---|---|
| 4,331,619 | A | 5/1982 | Chung et al. |
| 4,473,665 | A | 9/1984 | Martini-Vvedensky et al. |

(Continued)

FOREIGN PATENT DOCUMENTS

| | | | |
|---|---|---|---|
| CN | 1158627 | A | 9/1997 |
| CN | 1160411 | A | 9/1997 |

(Continued)

OTHER PUBLICATIONS

Wang et al. The Effect of NanoClay on the Crystallization Behavior, Microcellular Structure, and Mechanical Properties of Thermoplastic Polyurethane Nanocomposite Foams. Polymer Engineering and Science, Mar. 2016, vol. 56, Issue 3, p. 319-327. (Year: 2016).*

(Continued)

*Primary Examiner* — Kara B Boyle
(74) *Attorney, Agent, or Firm* — Drinker Biddle & Reath LLP

(57) ABSTRACT

A process for production of expanded thermoplastic elastomer beads in the presence of a gaseous medium that surrounds thermoplastic elastomer beads. The process comprises a) an impregnating step, in which the gaseous medium has an impregnating temperature $T_a$, and the absolute pressure of the gaseous medium is greater than ambient pressure, the thermoplastic elastomer beads impregnated with a blowing agent, b) an expanding step, in which the thermoplastic elastomer beads expand as they are exposed to a pressure reduction at a first expanding temperature $T_b$, and c) optionally a fusing step, in which the expanded thermoplastic elastomer beads are fused together at a fusing temperature $T_c$ to form at least one shaped part.

18 Claims, No Drawings

(51) Int. Cl.
| | |
|---|---|
| B29K 67/00 | (2006.01) |
| B29K 75/00 | (2006.01) |
| B29K 77/00 | (2006.01) |
| B29K 96/04 | (2006.01) |
| B29K 105/00 | (2006.01) |
| B29K 105/04 | (2006.01) |

(56) References Cited

U.S. PATENT DOCUMENTS

| | | | |
|---|---|---|---|
| 5,567,370 A | 10/1996 | Deseke et al. | |
| 5,670,102 A | 9/1997 | Perman et al. | |
| 5,703,135 A | 12/1997 | Schweinzer et al. | |
| 5,763,498 A | 6/1998 | Knaus | |
| 6,232,354 B1 | 5/2001 | Tan | |
| 2009/0048356 A1* | 2/2009 | Witten | B29Q 44/3446 521/54 |
| 2010/0047550 A1 | 2/2010 | Prissok et al. | |
| 2010/0155997 A1 | 6/2010 | Shikuma et al. | |
| 2010/0222442 A1 | 9/2010 | Prissok et al. | |
| 2011/0294910 A1 | 12/2011 | Kriha et al. | |
| 2012/0065285 A1* | 3/2012 | Braun | B29C 44/3446 521/64 |
| 2012/0329892 A1* | 12/2012 | Prissok | C08G 18/4854 521/60 |
| 2014/0151918 A1 | 6/2014 | Hartmann | |

FOREIGN PATENT DOCUMENTS

| | | |
|---|---|---|
| CN | 101370861 A | 2/2009 |
| CN | 101612772 A | 12/2009 |
| CN | 102229709 A | 11/2011 |
| CN | 103183955 A | 7/2013 |
| CN | 103298868 A | 9/2013 |
| EP | 0 664 197 A2 | 7/1995 |
| EP | 1354913 A1 | 10/2003 |
| EP | 1853655 A1 | 11/2007 |
| EP | 2217644 A1 | 8/2010 |
| JP | H6322168 A | 11/1994 |
| JP | H8113664 A | 5/1996 |
| JP | H1180408 A | 3/1999 |
| JP | 2001213991 A | 8/2001 |
| JP | 2003261707 A | 9/2003 |
| JP | 2013159758 A | 8/2013 |
| TW | I576475 B | 4/2017 |
| WO | WO-9420568 A1 | 9/1994 |
| WO | WO-9606129 A1 | 2/1996 |
| WO | WO-00/43193 A1 | 7/2000 |
| WO | WO-02/12379 A1 | 2/2002 |
| WO | WO-2004/018551 A2 | 3/2004 |
| WO | WO-2005/105907 A1 | 11/2005 |
| WO | WO-2006077395 A1 | 7/2006 |
| WO | WO-2007/044123 A1 | 4/2007 |
| WO | WO-2007082838 A1 | 7/2007 |
| WO | WO-2009063187 A1 | 5/2009 |
| WO | WO-2012065926 A1 | 5/2012 |
| WO | WO-2013013784 A1 | 1/2013 |

OTHER PUBLICATIONS

International Preliminary Examination Report for PCT/EP2014/071595 dated Dec. 14, 2015.
International Search Report for PCT/EP2014/071595 dated Nov. 6, 2014.
"Foamed Plastics", ULLMANN'S Encyclopedia Of Industrial Chemistry, 2016, pp. 1-54.
"Thermoplastic Polyurethane Elastomers (TPU)—Elastollan—Product Range", 2005, pp. 1-19.
"VICTREX PEEK 150GL30 (High Performance Polymers)", Brochure, 2015, pp. 1-2.
Yeh, S., et al., "Thermoplastic polyurethane/clay nancomposite foam made by batch foaming", Cellular Plastics, 2013, vol. 49, No. 2, pp. 119-130.
Lin, K., et al., "Batch Foaming Behavior Of TPU Material", 2012, pp. 2325-2329.
Ito, S., et al., "Generation of Microcellular Polyurethane with Supercritical Carbon Dioxide", Journal of Applied Polymer Science, 2007, vol. 106, pp. 3581-3586.
Hossieny, N., et al., "Foaming Behavior Of Melt Compounded Thermoplastic Polyurethane In Prescence of Butane", 2012, pp. 2307-2311.
Saniei, M., et al., Solid-State Batch Processing and Structure of Nano-cellular Thermoplastic Polyurethane foams, 2013, pp. 2687-2690.
Champagne, M., et al., "Soft Polyurethane Foams As Cartilage Replacement: Processing Behavior and Biocompatibility", ANTEC, 2009, pp. 2981-2985.
Guo, Y., et al., "Critical processing parameters for foamed bead manufacturing in a lab-scale autoclave system", Chemical Engineering Journal, 2013, vol. 214, pp. 180-188.
Hossieny, Nemat, "Effect of Glycerol Monosterate (GMS) on Crystallization of TPU and its Foaming Behavior", PPS-29 Presentation Slides. pp. 1-33.
"Proceedings of PPS-29; The 29th International Conference of the Polymer Processing Society Conference Papers", vol. 1593, 28 pages.
"Thermoplastic Polyurethane Elastomers (TPU) Elastollan—Product Range", 2016, pp. 1-40.
"Thermoplastic Polyurethane Elastomers—Elastollan—Material Properties", 2017, pp. 1-52.
Hossieny, N., et al., "Effects of Glycerol Monosterate on TPUs Crystallization and its Foaming Behavior", 2013, pp. 374-377.
PEBAX MV 1074 SA 01 MED Technical Data Sheet, Arkema Innovative Chemistry.
PEBAX 4033 SA 01 MED Technical Data Sheet, Arkema Innovative Chemistry.
PEBAX 40R53 SP 01 Technial Data Sheet, Arkema Innovative Chemistry.
HYRDOTHANE Datasheet, AdvanSource Biomaterials.
Nippon Miractran E180 Product Details, CMIB.
Nippon Miractran E190 Product Details, CMIB.
"Typical Room Temperature Properties Of Polyethermide (PEI)", Aetna Plastics.

* cited by examiner

METHOD FOR PRODUCING EXPANDED THERMOPLASTIC ELASTOMER PARTICLES

CROSS-REFERENCE TO RELATED APPLICATIONS

This application is a national stage application (under 35 U.S.C. § 371) of PCT/EP2014/071595, filed Oct. 9, 2014, which claims benefit of European Application No. 13188373.8, filed Oct. 11, 2013, both applications of which are incorporated herein by reference in their entirety.

The invention relates to a process for production of expanded thermoplastic elastomer beads wherein a gaseous medium surrounds thermoplastic elastomer beads, said process comprising an impregnating step, at least one expanding step and optionally a fusing step.

BACKGROUND OF THE INVENTION

Expanded beads of thermoplastic elastomers, in particular thermoplastic polyurethane (TPU), have elastic and tribological properties and so are useful in a very wide variety of applications. Examples of uses for expanded beads, which are also known as expanded pellets, include production of body protectors, such as helmet shells, knee and elbow protectors, sound and vibration absorbers or packaging, as well as production of gymnastics mats, shoe soles, midsoles, inlay soles or, in the automotive interior, production of, for example, steering wheel, door trim and foot space parts. Expanded thermoplastic elastomer beads are employed with particular preference in shoe soles, midsoles and inlay soles in sports shoes. High elasticity and good homogeneity on the part of the expanded beads are of decisive importance for all these sectors.

Expanded polymers, also known as foamed materials, or foams, and particularly expanded polymer beads, also called bead foams, are known and have been extensively described in the literature, for example in Ullmann's "Enzyklopädie der technischen Chemie", 4th edition, volume 20, p. 416 ff.

WO 2007/082838 discloses a process for production of expanded thermoplastic polyurethane comprising a blowing agent. A first step of the process comprises extruding a thermoplastic polyurethane into pellets. The pellets are impregnated with a blowing agent in an aqueous suspension under pressure in a second step and expanded in a third step. In a further embodiment of the process, the thermoplastic polyurethane is melted in an extruder together with a blowing agent and the melt is pelletized without a device to prevent foaming. Volatile organic compounds are used as blowing agents in the production via extrusion.

EP-A 0 664 197 discloses the production of expanded thermoplastic elastomers using water as blowing agent in an endeavor to avoid organic blowing agents. An alternative process for producing foams from thermoplastic elastomers by use of carbon dioxide and nitrogen as blowing agents is known, for example from WO 2004/018551. A further process for producing expanded thermoplastic elastomers which recurs to the foam production process described in WO 2004/018551 is also disclosed in WO 2007/044123.

JP 11080408 discloses a process for production of foams on the basis of thermoplastic resins wherein the materials are impregnated with blowing agent under elevated pressure and elevated temperature. Shaped and sized parts are first impregnated and then expanded. JP 2003 261707 similarly discloses a method of producing resinous foams. Pellet material is impregnated, melted, molded and foamed therein. An extruder is employed as molding machine.

WO 2005/105907 describes the production of closed-cell fluoropolymer foams wherein the resins are exposed to inert gases at elevated pressure and temperature and then expanded by reducing the pressure. The resins are cross-linked prior to expansion.

U.S. Pat. No. 4,331,619 describes a foam composition comprising an ethylene-chlorotrifluoroethylene copolymer, a blowing agent and a nucleating agent. It further describes a method wherein the polymer is impregnated by heating to temperatures above its melting point and an extruder is employed for expansion.

WO 00/43193 describes a process for production of microcellular polymer foam from amorphous, semicrystalline or crystalline polymer. It includes a step of saturating shaped bodies with an inert gas at elevated temperature. U.S. Pat. No. 4,473,665 describes the production of microcellular foam by employing extrusion or injection molding techniques.

WO 02/12379 discloses a production process for closed-cell crosslinked polymer foams wherein shaped parts comprising a mixed composition with blowing agent and cross-linking mediator are expanded and crosslinked in one step.

EP 2217644 discloses the production of fluoropolymer foams wherein the polymer material is mixed with blowing agents and additives, shaped and expanded. The shaping can also be achieved by expansion in a mold. The first step is to produce a blend of fluoropolymer resin and blowing agent wherein the blowing agent is in a non-gaseous state or in a state in which gas is not liberated from the blowing agent.

EP 1853655 describes polyamide foams and their method of making. Impregnation and expansion is carried out distinctly above the melting temperature. Shaped parts can be shaped out of the expanded material or be formed directly by expansion in a mold.

In US 2009/0048356 a polymer (preferably in granular form) is exposed to a gas which penetrates into the polymer. This is done at a temperature that is between the glass transition temperature and the melting temperature of the polymer when said polymer is crystalline or semicrystalline, or that is below the glass transition temperature when the polymer is an amorphous polymer. The polymer is then melted to produce foamed articles. In one embodiment, the polymer is completely melted to form a homogeneous melt.

None of the documents known from the prior art, however, discloses a process wherein thermoplastic elastomers such as thermoplastic polyester elastomers, thermoplastic copolyamides, thermoplastic polyurethanes and styrene block polymers are present as beads not only in the impregnating step but also in the expanding step, while a gaseous medium surrounds these beads.

DETAILED DESCRIPTION OF THE INVENTION

The production of expanded shapes by directly impregnating shaped parts which is disclosed in the prior art documents has the disadvantage of imprecise shaping and of nonuniform expansion of the entire shaped part to be expanded, which limits the complexity of the shaped parts. Nor can the shaped parts assume the desired shape during expansion.

There is a problem with the direct production of expanded beads via extrusion in that the beads expand without an uninterrupted skin forming in the process, and the expanded beads collapse, making it impossible to produce beads of low bulk density. Furthermore, the expansion of shaped parts or of polymer portions that have a small ratio of surface area to volume frequently results in an inhomogeneous cell size due to an inhomogeneous temperature distribution or due to an inhomogeneous distribution of the concentration of the blowing agent in the shaped part. The expansion of beads in a liquid medium is inconvenient, since the beads have to be removed and dried.

It is an object of the present invention to provide a process for production of expanded closed-cell thermoplastic elastomer beads which have an uninterrupted skin, a low density and a homogeneous cellular distribution and which do not have the disadvantages known from the prior art, whereby bead expansion and shaped-part production is possible in one operation and in one apparatus.

We have found that this object is achieved by a process for production of expanded thermoplastic elastomer beads wherein a gaseous medium surrounds thermoplastic elastomer beads, said process comprising a) an impregnating step,
  wherein the gaseous medium has an impregnating temperature $T_a$, the absolute pressure of the gaseous medium is greater than ambient pressure and
  wherein a blowing agent is dissolved in the thermoplastic elastomer beads,
b) an expanding step,
  wherein the thermoplastic elastomer beads are exposed to a pressure reduction at a first expanding temperature $T_b$ and expand, and
c) optionally a fusing step,
  wherein the expanded thermoplastic elastomer beads are fused together at a fusing temperature $T_c$ to form at least one shaped part, and
  wherein the thermoplastic elastomer beads are made from amorphous thermoplastic elastomer or partly crystalline thermoplastic elastomer, or mixtures thereof, the impregnating temperature $T_a$, the first expanding temperature $T_b$ and the fusing temperature $T_c$ depend on the nature of the thermoplastic elastomer in that
  i. when the thermoplastic elastomer is amorphous, the impregnating temperature $T_a$, the first expanding temperature $T_b$ and the fusing temperature $T_c$ are higher than a first limiting temperature $T_{G-40}$, wherein the first limiting temperature $T_{G-40}$ is 40° C. below the glass transition temperature $T_G$ according to DIN EN ISO 11357-2:2013-09 of the nonimpregnated thermoplastic elastomer beads,
  ii. when the thermoplastic elastomer is partly crystalline, the impregnating temperature $T_a$, the first expanding temperature $T_b$ and the fusing temperature $T_c$ are higher than the glass transition temperature $T_G$ according to DIN EN ISO 11357-2:2013-09 of the nonimpregnated thermoplastic elastomer beads and lower than a second limiting temperature $T_{S-5}$ which is 5° C. below the melting temperature $T_S$ according to DIN EN ISO 11357-3:2013-04 of the nonimpregnated thermoplastic elastomer beads.

In order that the expanded thermoplastic elastomer beads obtained with the process of the present invention may be fused directly into shaped parts, there is a preferred embodiment wherein the thermoplastic elastomer beads are placed in suitable molds in the pressure container before the impregnating step a) or before the expanding step b).

In one preferred embodiment of the process, the expansion of the thermoplastic elastomer beads in expanding step b) is only partial, which means that the pressure at the first expanding temperature $T_b$ is lowered to a pressure which is higher than ambient pressure, and that the partially expanded thermoplastic beads have a density that is greater than a minimum density that could be attained by pressure reduction to ambient pressure. Preferably, the partially expanded thermoplastic elastomer beads are then, in a further expanding step b2), expanded completely at a second expanding temperature $T_{b2}$, for which the pressure at the second expanding temperature $T_{b2}$ is reduced until a desired density is attained for the expanded thermoplastic elastomer beads. The desired density is more preferably attained once the pressure at the second expanding temperature $T_{b2}$ was reduced to ambient pressure. The expanding step b2) can take place in the same or some other apparatus than the expanding step b).

The process of the present invention provides a simple way to produce expanded thermoplastic elastomer beads that have a low density, closed cells and also a particularly homogeneous cell distribution. A preferred embodiment of the process according to the present invention further provides a way for impregnating, expanding and optionally also fusing to form at least one shaped part to be carried out in just one apparatus. A further advantage of the process according to the present invention is that the use of organic blowing agent can be eschewed.

The thermoplastic elastomer beads are preferably exposed to blowing agent in a pressure container, for example an autoclave reactor, at elevated temperature and elevated pressure, so the thermoplastic elastomer beads absorb blowing agent. The expanding step b) is preferably carried out in an inert atmosphere.

The expanded thermoplastic elastomer beads obtained are notable for a high elongation at break of more than 150%, measured to DIN EN ISO 527-2:2012-06, and also a homogeneous cell distribution, closed cells and an uninterrupted outer skin. The expanded thermoplastic elastomer beads have bead weights between 1 mg and 40 mg, preferably between 2 mg and 35 mg and more preferably between 10 mg and 35 mg. The size of the cells in the expanded thermoplastic elastomer beads produced according to the present invention is less than 350 µm, preferably less than 100 µm. The maximum dimension of the individual expanded thermoplastic elastomer beads is preferably in the range from 2 mm to 15 mm, in particular in the range from 5 mm to 12 mm.

The pressure required for impregnating step a) and expanding step b) and optionally for expanding step b2) and the necessary temperature are dependent on the thermoplastic elastomer used, the auxiliary materials used, the blowing agents used and the mixing ratios between the components.

The pressure of the gaseous medium in impregnating step a) depends on the desired rate for the decay of the pressure and is between 1 bar and 1000 bar, preferably between 50 bar and 700 bar, more preferably between 200 bar and 600 bar. When expanding step b) and/or expanding step b2) are/is carried out in a second apparatus, the starting pressure in the second apparatus is between 1 bar and 200 bar, preferably between 5 bar and 35 bar and more preferably between 5 bar and 25 bar.

The duration of impregnating step a) is dependent on more than one factor, in particular the material and the size of the beads, the temperature and the pressure in the pressure container. The duration of impregnating step a) is preferably sufficient to saturate the thermoplastic elastomer beads with blowing agents. Saturation of the thermoplastic elastomer beads can be ascertained via an iterative weighing operation, for example by means of a magnetic floating balance.

Any blowing agents known to a person skilled in the art can be used for impregnation. Preference is given to physical blowing agents such as, for example, alkanes such as butane, pentane, cyclopentane or octane, carbonyl compounds such as acetone, alcohols such as ethanol, fluorinated hydrocarbons or inert gases such as argon, nitrogen or carbon dioxide. The term physical blowing agents describes blowing agents, whose chemical structure remains unchanged during the process of expansion, whose state of aggregation can change during the process of expansion and which are gaseous for the process of expansion. Blowing agents are for example described in Thermoplastic Foam Processing Principles and Development, edited by Richard Gendron, CRC Press, 2005. Usage of $CO_2$ or $N_2$ or mixtures thereof is particularly preferred. Blowing agent mixtures with the recited flammable blowing agents can further also be used.

The $CO_2$ employed as blowing agent is employed with particular preference in the form of a mixture with $N_2$. Any desired mixing ratio of $CO_2$ to $N_2$ is possible in principle. However, it is preferable to employ a carbon dioxide and nitrogen blowing agent mixture comprising 50 wt % to 100 wt % of carbon dioxide and 0 wt % to 50 wt % of nitrogen. It is particularly preferable for the blowing agent to contain only $CO_2$, $N_2$ or a mixture of these two gases and no further blowing agent.

A physical blowing agent is preferably employed as blowing agent. The sole use of $CO_2$ and/or $N_2$ and also their combination as blowing agent is particularly advantageous, since they are inert gases, which are nonflammable, so that no potentially explosive atmospheres can arise in manufacture. This makes cost-intensive safety precautions unnecessary and greatly reduces the potential risk in production. It is likewise advantageous that the products do not have to be stored to allow flammable volatiles to gas out before the products are shipped out.

The blowing agent content is set to between 0.1 wt % and 20 wt %, preferably between 0.5 wt % and 15 wt % and more preferably to between 2 wt % and 10 wt %. This, coupled with proper process control, provides expanded beads having bulk densities between 25 g/l and 450 g/l, preferably 40 g/l and 200 g/l, in particular between 70 g/l and 185 g/l, or—directly—shaped parts having densities between 30 and 500 g/l, preferably 50 g/l and 250 g/l, in particular between 75 g/l and 210 g/l from these expanded beads by fusion in at least one mold.

The pressure and temperature at which the thermoplastic elastomer beads are expanded are chooseable process parameters. A lower pressure reduction rate or a higher remaining pressure level after pressure reduction counteracts the expanding effect of the blowing agent and slows the expansion of thermoplastic elastomer beads. The lower the temperature is chosen in the process, the thicker is a skin on the beads, which offers resistance to expansion. When the pressure is too high for the blowing agent used, or the temperature too low, expansion of the thermoplastic elastomer beads can be hindered or even completely prevented, which produces expanded thermoplastic elastomer beads of excessively high bulk density. In this case, the pressure and/or the temperature in expanding step b) should be increased.

In expanding step b) and optionally in expanding step b2), the temperature is preferably maintained at the first expanding temperature $T_b$ or, respectively, at the second expanding temperature $T_{b2}$ until the desired expansion is achieved. The progress of expansion can be policed via the pressure reduction/decay rate, which is between 50 bar/s and 5000 bar/s, preferably between 100 bar/s and 1000 bar/s. A reduction in the pressure at pressure decay rates from these recited ranges will also be referred to herein as sudden pressure drop.

The residence time in the pressure container, i.e., the duration of impregnating step a) and of expanding step b) and optionally of expanding step b2) and of fusing step c), is between 0.25 hour and 12 hours, preferably between 1 hour and 6 hours.

The thermoplastic elastomer beads are made from amorphous thermoplastic elastomer or of partly crystalline thermoplastic elastomer, or of mixtures thereof. The preferred range for the choice of temperature for the gaseous medium during impregnating step a) (impregnating temperature $T_a$) and expanding step b) (first expanding temperature $T_b$) and optionally expanding step b2) (second expanding temperature $T_{b2}$) depends with amorphous thermoplastic elastomers on the glass transition temperature $T_G$ of the nonimpregnated thermoplastic elastomer and with partly crystalline thermoplastic elastomers on the melting temperature $T_S$ of the nonimpregnated thermoplastic elastomer. Glass transition temperature $T_G$ in the context of the present invention is the temperature that is defined by DIN EN ISO 11357-2:2013-09. The melting temperature of partly crystalline thermoplastic elastomers in the context of the present invention is the temperature that is defined by DIN EN ISO 11357-3:2013-04. When the thermoplastic elastomer beads are made from amorphous thermoplastic elastomer, the impregnating temperature $T_a$, the first expanding temperature $T_b$, the second expanding temperature $T_{b2}$ and the fusing temperature $T_c$ are preferably higher than the first limiting temperature $T_{G-40}$, which is 40° C. below the glass transition temperature $T_G$ of the nonimpregnated thermoplastic elastomer beads. When the thermoplastic elastomer beads are made from partly crystalline thermoplastic elastomer, the impregnating temperature $T_a$, the first expanding temperature $T_b$, the second expanding temperature $T_{b2}$ and the fusing temperature $T_c$ are preferably higher than the glass transition temperature $T_G$ of the nonimpregnated thermoplastic elastomer beads and lower than the second limiting temperature $T_{S-5}$, which is 5° C. below the melting temperature $T_S$ of the nonimpregnated thermoplastic elastomer beads. When the thermoplastic elastomer beads are made from a mixture of amorphous and partly crystalline thermoplastic elastomer and the mixed thermoplastic elastomers are mutually miscible homogeneously, the impregnating temperature $T_a$, the first expanding temperature $T_b$, the second expanding temperature $T_{b2}$ and the fusing temperature $T_c$ are preferably higher than higher than the first limiting temperature $T_{G-40}$ and more preferably higher than the glass transition temperature $T_G$ of the nonimpregnated thermoplastic elastomer beads and lower than the second limiting temperature $T_{S-5}$. When the thermoplastic elastomer beads are made from a mixture of amorphous and partly crystalline thermoplastic elastomer and the mixed thermoplastic elastomers are not mutually miscible homogeneously, the preferred temperatures for the mixture correspond to the preferred temperatures for a matrix phase of the heterogeneous mixture. The matrix phase can be amorphous or partly crystalline.

The impregnating temperature $T_a$, the first expanding temperature $T_b$, optionally the second expanding temperature $T_{b2}$ and the fusing temperature $T_c$ can be identical to or different from each other. The fusing step c) can be carried out simultaneously with the expanding step b) or optionally the expanding step b2). In this case, the first expanding temperature $T_b$ and the fusing temperature $T_c$ or optionally the second expanding temperature $T_{b2}$ and the fusing temperature $T_c$ are identical.

In a further preferred embodiment, the temperature of the thermoplastic elastomer beads is reduced to a temperature $T_p$ between impregnating step a) and expanding step b) and optionally between expanding step b) and expanding step b2) to form partially expanded thermoplastic elastomer beads which can be stored or else used in partially expanded form.

In a further preferred embodiment, the impregnating step a) and also the first expanding step b) take place at the first expanding temperature $T_b$ in a first apparatus and the subsequent second expanding step b2) takes place at the second expanding temperature $T_{b2}$ in a second apparatus. In this embodiment, impregnating step a) is followed by the pressure being lowered in the first expanding step b) to a pressure which is higher than ambient pressure but lower than the pressure employed in impregnating step a). This results in a partial expansion of the thermoplastic elastomer beads. Subsequently, the partially expanded thermoplastic elastomer beads are cooled down to a temperature $T_p$, which is lower than the first expanding temperature $T_b$ and lower than the second expanding temperature $T_{b2}$ and below the first limiting temperature $T_{G-40}$, in order to prevent any further expansion in the first apparatus. Subsequently, the partially expanded thermoplastic elastomer beads are heated in the second apparatus under again elevated pressure, which is higher than ambient pressure, to the second expanding temperature $T_{b2}$ and expanded to the desired density by renewed reduction in pressure. Once the desired density is attained, the expansion is referred to as "complete". This is for example the case when the pressure is reduced down to ambient pressure at the temperature $T_b$ or the second expanding temperature $T_{b2}$. Expanding step b2) in the second apparatus is also with preference carried out in an inert gas atmosphere. Ambient pressure for the purposes of the present invention is a pressure in the range between 0.9 and 1.09 bar, in particular equal to 1.013 bar.

In a further preferred embodiment, the thermoplastic elastomer beads are placed before impregnating step a) or before expanding step b) into at least one perforated mold conformal to the desired shaped part, so the thermoplastic elastomer beads can be processed in the first, second or some further apparatus into at least one ready-produced shaped part. The amount of thermoplastic elastomer beads in the at least one mold is preferably determined such that the expanded thermoplastic elastomer beads fill the at least one mold completely after expansion. The amount of which is used of thermoplastic elastomer beads can be used to influence the density of the at least one shaped part. A larger amount of thermoplastic elastomer beads in the mold leads to a higher density on the part of the shaped part which is manufactured.

When the beads are not fused directly in the first or second apparatus, the expanded beads obtained according to the present invention can subsequently be fused or adhered into shaped parts by methods known to a person skilled in the art, or be used in further ways known to a person skilled in the art.

In a further embodiment, the thermoplastic elastomer beads can be partly crosslinked ahead of the impregnating step a) via methods known in the literature, wherein crosslinks mean long chain branches and wherein the crosslinking is carried out only to such a degree, that the thermoplastic properties are maintained. This can be advantageous for the production especially of expanded thermoplastic elastomer beads comprising essentially partly crystalline thermoplastic elastomers. Crosslinking can be achieved for example through employment of crosslinking reagents, for example triallyl cyanurates or O—O-labile compounds, or through the deployment of gamma rays or electrons. When gamma rays are used, typical doses of radiation for crosslinking range from 5 kGy to 200 kGy, preferably from 25 kGy to 100 kGy. Crosslinking is preferably achieved without the employment of crosslinking reagents.

The process of the present invention can be used to produce expanded thermoplastic elastomer beads and shaped parts formed from expanded thermoplastic elastomer beads, the thermoplastic elastomers preferably comprising thermoplastic polyester elastomers such as polyetheresters and polyesteresters, thermoplastic copolyamides such as polyethercopolyamides, styrene block copolymers such as styrene butadiene blockcopolymers or thermoplastic polyurethanes, or mixtures thereof. Most preferably, the thermoplastic elastomers are thermoplastic polyester elastomers such as polyetheresters and polyesteresters, thermoplastic copolyamides such as polyethercopolyamides, styrene block copolymers such as styrenebutadiene blockcopolymers or thermoplastic polyurethanes, or mixtures thereof. Blends of the systems referred to here can additionally also be used.

The thermoplastic elastomer beads used are preferably formed by extrusion.

The melting point of the preferably used thermoplastic elastomers is preferably below 300° C., more preferably not more than 250° C. and especially not more than 220° C. The elongation at break of preferably used thermoplastic elastomers is greater than 100% measured to DIN EN ISO 527-2:2012-06, preferably greater than 150% and more preferably greater than 200%.

The preferably used thermoplastic elastomers may be amorphous or partly crystalline.

The expanded beads obtained using the process of the present invention may further comprise added-substance materials such as dyes, pigments, fillers, flame retardants, synergists for flame retardants, antistatics, stabilizers, surface-active substances, plasticizers and IR opacifiers in effective amounts. The proportion which added-substance materials contribute to the overall mass of the thermoplastic beads is preferably in the range from 0 to 80 wt %.

Suitable IR opacifiers to reduce the radiative contribution to thermal conductivity include, for example, metal oxides, nonmetal oxides, metal powders, for example aluminum powders, carbon, for example carbon black, graphite or diamond, or organic dyes and pigment dyes. The use of IR opacifiers is advantageous for applications at high temperatures in particular. Carbon black, titanium dioxide, iron oxides or zirconium dioxide are particularly preferred for use as IR opacifiers. The aforementioned materials can be used not only each on its own but also in combination, i.e., in the form of a mixture of two or more materials. Any fillers can be organic and/or inorganic.

Further added-substance materials and auxiliary materials are found in standard reference works such as, for example, the above-cited Gerhard W. Becker and Dietrich Braun, Kunststoffhandbuch, Volume 7, Polyurethane, Carl Hanser Verlag, Munich, Vienna, 1993.

Suitable flame retardants include for example tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate. In addition to the halogen-substituted phosphates already mentioned, inorganic flame retardants comprising red phosphorus, aluminum oxide hydrate, antimony trioxide, arsenic trioxide, ammonium polyphosphate and calcium sulfate or cyanuric acid derivatives, for example melamine or mixtures of at least two flame retardants, for example ammonium phosphate and melamine and also optionally starch and/or expandable graphite can also be used for conferring flame retardancy on the expanded thermoplastic elastomers produced. It will generally prove advantageous to use from 0 to 50 wt % and preferably from 5 to 25 wt % of flame retardants or flame retardant mixtures based on the overall weight of the thermoplastic beads comprising blowing agent.

A nucleating agent can be used to specifically influence the cells as they expand, producing a uniform expanded bead. More particularly, the use of a nucleating agent creates a uniform cell structure. Nucleating agents used are preferably powders having an average particle size in the range from 0.01 μm to 100 μm.

Useful nucleating agents include in particular talc, carbon black, graphite and pigments each individually or else in any mixtures. Talc is particularly preferable to use as nucleating agent. The proportion of the overall mass of the thermoplastic beads and/or of the polymer melt which is attributable to nucleating agent is preferably in the range from 0 wt % to 4 wt %, and especially in the range from 0.1 wt % to 2 wt %.

When a thermoplastic polyurethane is used, the thermoplastic polyurethane may be any desired thermoplastic polyurethane known to a person skilled in the art. Thermoplastic polyurethanes and their methods of making have already been extensively described, for example in Gerhard W. Becker and Dietrich Braun, *Kunststoffhandbuch*, Volume 7*Polyurethane*, Carl Hanser Verlag, Munich, Vienna, 1993.

In a preferred embodiment, the thermoplastic polyurethane is prepared by reacting a mixture of isocyanates with isocyanate-reactive compounds, preferably having a molecular weight of 0.5 kg/mol to 10 kg/mol and optionally chain-extending agents, preferably having a molecular weight of 0.05 kg/mol to 0.5 kg/mol. In a further preferred embodiment, the thermoplastic polyurethane is prepared by further adding to the mixture at least one chain transfer agent, a catalyst and optionally at least one filler, auxiliary and/or added-substance material.

The preparation of thermoplastic polyurethane requires at any rate a mixture of isocyanates and isocyanate-reactive compounds. The further addition of chain-extending agents, chain transfer agents, catalysts and filler, auxiliary and/or added-substance materials is optional and can take place individually or in all possible variations.

Preferred embodiments utilize aliphatic, cycloaliphatic, and/or aromatic isocyanates as organic isocyanates. Particular preference is given to using aromatic, aliphatic and/or cycloaliphatic diisocyanates. Examples of preferred diisocyanates are trimethylene diisocyanate, tetramethylene diisocyanate, pentamethylene diisocyanate, hexamethylene diisocyanate, heptamethylene diisocyanate, octamethylene diisocyanate, 2-methyl-1,5-pentamethylene diisocyanate, 2-ethyl-1,4-butylene diisocyanate, 1,5-pentamethylene diisocyanate, 1,4-butylene diisocyanate, 1-isocyanato-3,3,5-trimethyl-5-isocyanatomethylcyclohexane, 1,4-bis(isocyanatomethyl)cyclohexane, 1,3-bis(isocyanatomethyl)cyclohexane, 1,4-cyclohexane diisocyanate, 1-methyl-2,4-cyclohexane diisocyanate, 1-methyl-2,6-cyclohexane diisocyanate, 2,2'-dicyclohexylmethane diisocyanate, 2,4'-dicyclohexylmethane diisocyanate, 4,4'-dicyclohexylmethane diisocyanate, 2,2'-diphenylmethane diisocyanate, 2,4'-diphenylmethane diisocyanate, 4,4'-diphenylmethane diisocyanate, 1,5-naphthylene diisocyanate, 2,4-tolylene diisocyanate, 2,6-tolylene diisocyanate, diphenylmethane diisocyanate, 3,3'-dimethylbiphenyl diisocyanate, 1,2-diphenylethane diisocyanate and phenylene diisocyanate.

In addition to the isocyanate, the thermoplastic molding composition is made from a compound having at least two isocyanate-reactive hydrogen-containing groups. The isocyanate-reactive hydrogen-containing group is preferably a hydroxyl group. It is particularly preferable for the compound having at least two isocyanate-reactive hydrogen-containing groups to be selected from polyetherol, polyesterol and polycarbonate diol. In this context, polyesterols, polyetherols and/or polycarbonate diols are usually also subsumed under the term "polyols".

The thermoplastic polyurethane is preferably prepared from polyether alcohol. It is particularly preferable to use polyether diol here. Polytetrahydrofuran is a particularly preferred polyether diol. Preference is given to using polyether alcohols and polytetrahydrofuran having a molecular weight between 0.6 kg/mol and 2.5 kg/mol. The polyether alcohols are used individually or else as a mixture of various polyether alcohols.

In an alternative embodiment, a polyester alcohol is used to prepare the thermoplastic polyurethane. Polyester diol is used for this in a preferred embodiment. A preferred polyester diol is prepared from adipic acid and 1,4-butanediol. Preferred embodiments of polyester alcohols have a molecular weight between 0.6 kg/mol and 2.5 kg/mol.

In further preferred embodiments, the polyols used for preparing the thermoplastic polyurethane have molecular weights of 0.5 kg/mol to 8 kg/mol, more preferably of 0.6 kg/mol to 6 kg/mol and especially of 0.8 kg/mol to 4 kg/mol. In further preferred embodiments, the polyols have an average functionality of 1.8 to 2.3, more preferably of 1.9 to 2.2 and especially of 2. In a particularly preferred embodiment, the polyol is a polyester alcohol, preferably synthesized from polytetrahydrofuran and has a molecular weight between 0.6 kg/mol and 2.5 kg/mol in a further preferred embodiment.

When the thermoplastic polyurethane is prepared using chain extenders, these are preferably aliphatic, araliphatic, aromatic and/or cycloaliphatic compounds which, in further preferred embodiments, have a molecular weight of 0.05 kg/mol to 0.5 kg/mol. Chain extenders are for example compounds having two functional groups, for example diamines and/or alkanediols having 2 to 10 carbon atoms in the alkylene moiety, especially 1,4-butanediol, 1,6-hexanediol and/or di-, tri-, tetra-, penta-, hexa-, hepta-, octa-, nona- and/or decaalkylene glycols having 3 to 8 carbon atoms and corresponding oligo- and/or polypropylene glycols. Further embodiments for preparing the thermoplastic polyurethane utilize mixtures of chain extenders.

When chain transfer agents are used, these typically have a molecular weight of 0.03 kg/mol to 0.5 kg/mol. Chain transfer agents are compounds that have only one functional group in respect of isocyanates. Examples of chain transfer agents are monofunctional alcohols, monofunctional amines, preferably methylamine and/or monofunctional polyols. Chain transfer agents can be used to specifically control the flow characteristics of mixtures of the individual components. Chain transfer agents in preferred embodiments are used in an amount of 0 part by weight to 5 parts by weight and more preferably in the range from 0.1 part by weight to 1 part by weight, based on 100 parts by weight of the compound having at least two isocyanate-reactive hydrogen-containing groups. Chain transfer agents are used in addition to or instead of chain extenders.

Further embodiments utilize at least one catalyst to prepare thermoplastic polyurethane to catalyze in particular the reaction between the isocyanate groups of the diisocyanates and the isocyanate-reactive compounds, preferably hydroxyl groups, of the compound having at least two isocyanate-reactive hydrogen-containing groups, the chain transfer agents and the chain extenders. In preferred embodiments, the catalyst is selected from the group of tertiary amines, for example triethylamine, dimethylcyclohexylamine, N-methylmorpholine, N,N'-dimethyl-piperazine, 2-(dimethylaminoethoxy)ethanol, diazabicyclo(2,2,2)octane and similar substances. In further preferred embodiments, the at least one catalyst is selected from the group of organometallic compounds and is, mentioned by way of example, a titanic ester, an iron compound, for example iron(III) acetylacetonate, a tin compound, for example tin diacetate, tin dioctoate, tin dilaurate or a tin dialkyl salt of an aliphatic carboxylic acid such as dibutyltin diacetate, dibutyltin dilaurate or the like.

Some embodiments utilize the catalysts individually, while other embodiments utilize mixtures of catalysts. The catalyst used in one preferred embodiment is a mixture of catalysts in amounts of 0.0001 wt % to 0.1 wt %, based on the compound having at least two isocyanate-reactive hydrogen-containing groups, preferably the polyhydroxy compound.

In addition to catalysts, but also without the use of catalysts, hydrolysis control agents, for example polymers and low molecular weight carbodiimides, can also be added to the isocyanates and the compound having at least two isocyanate-reactive hydrogen-containing groups to prepare the thermoplastic polyurethane.

In a further embodiment, the thermoplastic polyurethane may comprise a phosphorus compound. A preferred embodiment uses organophosphorus compounds of trivalent phosphorus, for example phosphites and phosphonites. Examples of suitable phosphorus compounds are triphenyl phosphites, diphenyl alkyl phosphite, phenyl dialkyl phosphite, tris(nonylphenyl) phosphite, trilauryl phosphite, trioctadecyl phosphite, distearylpentaerythritol disphosphite, tris(2,4-di-tert-butylphenyl) phosphite, diisodecylpentaerythritol diphosphite, di(2,4-di-tert-butylphenyl)pentaerythritol diphosphite, tristearylsorbitol triphosphite, tetrakis(2,4-di-tert-butylphenyl)-4,4'-biphenylylene diphosphonite, triisodecyl phosphite, diisodecyl phenyl phosphite and diphenyl isodecyl phosphite or mixtures thereof.

Particularly preferred embodiments comprise phosphorus compounds that are difficult to hydrolyze, since the hydrolysis of a phosphorus compound to the corresponding acid can lead to damage being inflicted on the polyurethane, especially the polyester urethane. Accordingly, phosphorus compounds that are particularly difficult to hydrolyze are suitable for polyester urethanes in particular. Preferred embodiments of difficult-to-hydrolyze phosphorus compounds are dipolypropylene glycol phenyl phosphite, diisodecyl phosphite, triphenylmonodecyl phosphite, triisononyl phosphite, tris(2,4-di-tert-butylphenyl) phosphite, tetrakis(2,4-di-tert-butyl phenyl)-4,4'-biphenylylene diphosphonite and di(2,4-di-tert-butyl phenyl) pentaerythritol diphosphite or mixtures thereof.

To set the Shore hardness of thermoplastic polyurethanes the compounds having at least two isocyanate-reactive hydrogen-containing groups and the chain extenders can be varied within relatively wide molar ratios. In preferred embodiments the molar ratio of compounds having at least two isocyanate-reactive hydrogen-containing groups to total chain extender used is in the range from 10:1 to 1:10, preferably in the range from 5:1 to 1:8 and more preferably in the range from 1:1 to 1:4, the hardness of the thermoplastic polyurethane increasing with increasing chain-extender content. Shore hardnesses ranging from A44 to D80 can be set in this way. Shore hardnesses ranging from A44 to A99, in particular from A44 to A96, are particularly preferred. Shore hardnesses are determined according to DIN 53505:1987-06.

In further preferred embodiments, the reaction to form the thermoplastic polyurethane is carried out at customary indices. The index is defined as the ratio of the total number of isocyanate groups of the aromatic, aliphatic and/or cycloaliphatic diisocyanate which are used in the reaction to the total number of isocyanate-reactive groups, i.e., the number of active hydrogens in the compound having at least two isocyanate-reactive hydrogen-containing groups and the chain extenders. An index of 100 means that there is one active hydrogen atom, i.e., an isocyanate-reactive function of the compound having at least two isocyanate-reactive hydrogen-containing groups and the chain extenders per isocyanate group of the aromatic, aliphatic and/or cycloaliphatic diisocyanate. Indices above 100 mean that there are more isocyanate groups than there are isocyanate-reactive groups, for example hydroxyl groups.

In particularly preferred embodiments the reaction to form the thermoplastic polyurethane takes place at an index between 60 and 120 and more preferably at an index between 80 and 110.

When thermoplastic polyetheresters and/or polyesteresters are used, these are obtainable according to any common literature method by esterification or transesterification of aromatic and aliphatic dicarboxylic acids of 4 to 20 carbon atoms and, respectively, esters thereof with suitable aliphatic and aromatic diols and polyols (cf. for example "Polymer Chemistry", Interscience Publ., New York, 1961, pp. 111-127; Kunststoffhandbuch, volume VIII, C. Hanser Verlag, Munich 1973 and Journal of Polymer Science, Part A1, 4, pages 1851-1859 (1966)).

Useful aromatic dicarboxylic acids include, for example, phthalic acid, isophthalic acid and terephthalic acid or, respectively, esters thereof. Useful aliphatic dicarboxylic acids include, for example, 1,4-cyclohexanedicarboxylic acid, adipic acid, sebacic acid, azelaic acid, and decanedicarboxylic acid as saturated dicarboxylic acids and also maleic acid, fumaric acid, aconitic acid, itaconic acid, tetrahydrophthalic acid and tetrahydroterephthalic acid as unsaturated dicarboxylic acids.

Useful diol components include for example:
diols of general formula HO—$(CH_2)_n$—OH, where n=2 to 20, such as ethylene glycol, 1,3-propanediol, 1,4-butanediol or 1,6-hexanediol,
polyetherols of general formula HO—$(CH_2)_n$—O—$(CH_2)_m$—OH, where n and m are each=2 to 20 and n and m may be the same or different,
unsaturated diols and polyetherols such as, for example, 1,4-butenediol,
diols and polyetherols comprising aromatic units,
polyesterols.

In addition to the recited carboxylic acids and esters thereof and also the recited alcohols, any further common representatives of these classes of compounds can be used for providing the polyetheresters and polyesteresters used with preference.

Hard phases are typically formed from aromatic dicarboxylic acids and short-chain diols, while soft phases are formed from ready-formed aliphatic, difunctional polyesters having a molecular weight between 500 g/mol and 3000 g/mol.

The thermoplastic polyetheramides are obtainable according to any common, known literature method via reaction of amines and carboxylic acids, or esters thereof, or other derivatives.

Amines and/or carboxylic acids in this case further comprise ether units of the R—O—R type, where R is an aliphatic and/or aromatic organic radical. Monomers selected from the following classes of compounds are used in general:

- HOOC—R'—$NH_2$, where R' may be aromatic and aliphatic and preferably comprises ether units of the R—O—R type. R therein is an aliphatic and/or aromatic organic radical,
- aromatic dicarboxylic acids, for example phthalic acid, isophthalic acid and terephthalic acid, or esters thereof, and also aromatic dicarboxylic acids comprising ether units of the R—O—R type, where R is an aliphatic and/or aromatic organic radical,
- aliphatic dicarboxylic acids, for example 1,4-cyclohexanedicarboxylic acid, adipic acid, sebacic acid, azelaic acid, and decanedicarboxylic acid as saturated dicarboxylic acids and also maleic acid, fumaric acid, aconitic acid, itaconic acid, tetrahydrophthalic acid and tetrahydroterephthalic acid as unsaturated dicarboxylic acids, and also aliphatic dicarboxylic acids comprising ether units of the R—O—R type, where R is an aliphatic and/or aromatic organic radical,
- diamines of general formula $H_2N$—R''—$NH_2$, where R'' may be aromatic and aliphatic and preferably comprises ether units of the R—O—R type, where R is an aliphatic and/or aromatic organic radical,
- lactams, for example ε-caprolactam, pyrrolidone or laurolactam, and also
- amino acids.

In addition to the recited carboxylic acids and esters thereof and also the recited amines, lactams and amino acids, any further common representatives of these classes of compounds can be used for providing a polyetheramine used with preference. Also known are mixed products of polytetrahydrofuran and amide synthons.

The preferably used thermoplastic elastomers of copolymer structure comprise vinylaromatic, butadiene and isoprene and also polyolefin and vinylic units, for example ethylene, propylene and vinyl acetate units. Styrene-butadiene copolymers are preferred The preferably used thermoplastic elastomers of block copolymer structure, polyetheramides, polyetheresters & polyesteresters are chosen such that Shore hardnesses of A44 to D80 are obtained. Particular preference is given to Shore hardnesses of A40 to A99, in particular of A44 to A96. Shore hardnesses are determined to DIN 53505:1987-06.

When polyetheramides are used, it is preferable to use products of the Pebax® type from Arkema (e.g., Pebax® 2533 or Pebax® 3533) or of the Vestamid® type from Evonik (e.g., Vestamid® E40S3). When polyesteresters are used, it is preferable to use products of the Pelprene® type from Tojobo (e.g., Pelprene® 51001 or Pelprene® P70B). When polyetheresters are used, it is preferable to use products of the Elastotec® type from BASF (e.g., Elastotec® A 4512), of the Arnitel® type from DSM (e.g., Arnitel® PL380 or Arnitel® EB463), of the Hytrel® type from DuPont (e.g., Hytrel® 3078), of the Riteflex® type from Ticona (e.g., Riteflex® 430 or Riteflex® 635) or of the Ecdel® type from Eastman Chemical (e.g., Ecdel® Elastomer 9965 or Ecdel® Elastomer 9965).

EXAMPLES

The examples which follow illustrate the invention.

Example 1

A thermoplastic elastomer (TPE) is used in the form of a thermoplastic polyurethane based on 4,4'-diphenylmethane diisocyanate (MDI), polytetrahydrofuran (Poly-THF) and 1,4-butanediol having an elongation at break of more than 600% and a Shore hardness of 80 A, available for example as Elastollan® 1180A10 from BASF Polyurethans.

100 g of thermoplastic elastomer beads in the form of raw pellets are impregnated with $N_2$ in an autoclave reactor at a pressure of 350 bar and a temperature of 130° C. for 3.5 h. This is followed by reducing the pressure to ambient and cooling of the autoclave reactor. After cooling down to room temperature (20° C.), the expanded thermoplastic elastomer beads thus obtained have a bulk density of 112 g/l.

Example 2

A TPE is used in the form of a thermoplastic polyurethane based on 4,4'-diphenylmethane diisocyanate (MDI), polytetrahydrofuran (Poly-THF) and 1,4-butanediol having an elongation at break of more than 600% and a Shore hardness of 80 A, available for example as Elastollan® 1180A10 from BASF Polyurethans.

100 g of raw pellets are impregnated with a blowing agent mixture comprising exclusively $N_2$ and $CO_2$ in an amount-of-substance ratio of 1:1 in an autoclave reactor at a pressure of 350 bar and a temperature of 130° C. for 3.5 h. The reactor is then cooled to 60° C. and, once the temperature has been reached, the pressure is reduced to ambient. The partially expanded thermoplastic elastomer beads are then removed and transferred into a second reactor. In the second reactor, they are again heated to 130° C., this time at a pressure of 20 bar, and in the presence of $N_2$ before sudden pressure drop to ambient causes the beads to expand into homogeneously expanded thermoplastic elastomer beads. After cooling down to room temperature, the expanded thermoplastic elastomer beads thus obtained have a bulk density of 125 g/l.

Example 3

A TPE is used in the form of a thermoplastic polyurethane based on 4,4'-diphenylmethane diisocyanate (MDI), polytetrahydrofuran (Poly-THF) and 1,4-butanediol having an elongation at break of more than 800% and a Shore hardness of 70 A, available for example as Elastollan® 1170A10 from BASF Polyurethans.

100 g of raw pellets are impregnated with $N_2$ in an autoclave reactor at a pressure of 300 bar and a temperature of 115° C. for 3.5 h. The reactor is then cooled to 55° C. and, once the temperature has been reached, the pressure is reduced to ambient. The partially expanded thermoplastic elastomer beads are then removed and transferred into a second reactor. In the second reactor, they are again heated to 115° C., this time at a pressure of 18 bar, and in the presence of $N_2$ before sudden pressure drop to ambient causes the beads to expand into homogeneously expanded thermoplastic elastomer beads. After cooling down to room temperature, the expanded thermoplastic elastomer beads thus obtained have a bulk density of 109 g/l.

Example 4

A TPE is used in the form of a styrene-butadiene block copolymer (SBC) having the properties of a thermoplastic elastomer (S-TPE), an elongation at break of more than 300%, a Shore hardness of 84 A, a melt volume rate (MVR at 200° C./5 kg) of 14 cm³/10 min, available for example as Styroflex® 2G66 from Styrolution.

100 g of raw pellets are impregnated with $N_2$ in an autoclave reactor at a pressure of 410 bar and a temperature of 70° C. for 4 h. This is followed by reducing the pressure to ambient and cooling of the autoclave reactor. After cooling down to room temperature, the expanded thermoplastic elastomer beads thus obtained have a bulk density of 137 g/l.

Example 5

A TPE is used in the form of a polyesterester based on polytetrahydrofuran (Poly-THF) and polybutylene terephthalate (PBT) having an elongation at break of above 500% and a Shore hardness of 90 A.

100 g of raw pellets are impregnated with $CO_2$ in an autoclave reactor at a pressure of 380 bar and a temperature of 150° C. for 4 h. This is followed by reducing the pressure to ambient and cooling of the autoclave reactor. After cooling down to room temperature, the expanded thermoplastic elastomer beads thus obtained have a bulk density of 182 g/l.

Example 6

A TPE is used in the form of a polyesterester based on 1,4-benzdicarboxylic acid, dimethyl ester, 1,4-butanediol and α-hydro-ω-hydroxypoly(oxy-1,4-butanediyl) and having an elongation at break of more than 700% and a Shore hardness of 96 A, obtainable for example as Pelprene® P-70B from Toyobo Co, Ltd.

100 g of raw pellets are impregnated with $CO_2$ in an autoclave reactor at a pressure of 380 bar and a temperature of 140° C. for 3 h. This is followed by reducing the pressure to ambient and cooling of the autoclave reactor. After cooling down to room temperature, the expanded thermoplastic elastomer beads thus obtained have a bulk density of 143 g/l.

Example 7

A TPE is used in the form of a polyetheramide based on flexible polytetrahydrofuran and crystalline polyamide units and having an elongation at break of more than 700% and a Shore hardness of 77 A, obtainable for example as Pebax® 2533SD from Arkema.

100 g of raw pellets are impregnated with $CO_2$ in an autoclave reactor at a pressure of 170 bar and a temperature of 135° C. for 4 h. This is followed by reducing the pressure to ambient and cooling of the autoclave reactor. After cooling down to room temperature, the expanded thermoplastic elastomer beads thus obtained have a bulk density of 134 g/l.

Example 8

A TPE is used in the form of a polyetherester having a polyether soft segment having an elongation at break of more than 450% and a Shore hardness of 38 D and an MVR (190° C./2.16 kg) of 28 cm³/10 min, obtainable for example as Arnitel® PL380 from DSM.

100 g of raw pellets are impregnated with $CO_2$ in an autoclave reactor at a pressure of 350 bar and a temperature of 200° C. for 4 h. This is followed by reducing the pressure to ambient and cooling of the autoclave reactor. After cooling down to room temperature, the expanded thermoplastic elastomer beads thus obtained have a bulk density of 175 g/l.

Example 9

A TPE is used in the form of a polyetherester based on hard (crystalline) polybutylene terephthalate segments and soft (amorphous) units derived from long-chain polyether glycols having an elongation at break of more than 700%, a Shore hardness of 30D and an MFR mass flow rate at 190° C./2.16 kg of 5 g/10 min, obtainable for example as Hytrel® 3078 from DuPont.

100 g of raw pellets are impregnated with $CO_2$ in an autoclave reactor at a pressure of 320 bar and a temperature of 145° C. for 4 h. This is followed by reducing the pressure to ambient and cooling of the autoclave reactor. After cooling down to room temperature, the expanded thermoplastic elastomer beads thus obtained have a bulk density of 149 g/l.

Example 10

A TPE is used in the form of a thermoplastic polyurethane based on 4,4'-diphenylmethane diisocyanate (MDI), polytetrahydrofuran (Poly-THF) and 1,4-butanediol having an elongation at break of more than 600% and a Shore hardness of 80 A, available for example as Elastollan® 1180A10 from BASF Polyurethans.

100 g of raw pellets are impregnated with a blowing agent mixture comprising exclusively $N_2$ and $CO_2$ in an amount-of-substance ratio of 1:1 in an autoclave reactor at a pressure of 350 bar and a temperature of 130° C. for 3.5 h. The reactor is then cooled to 60° C. and, once the temperature has been reached, the pressure is reduced to ambient. The partially expanded thermoplastic elastomer beads are then removed, poured into a perforate square mold (500 ml in volume) and transferred into a second reactor. The second reactor is heated to 135° C., this time at a pressure of 20 bar, and in the presence of $N_2$. Following sudden pressure drop to ambient and cooling to room temperature, the fused shaped part having a bulk density of 201 g/l can finally be removed from the perforate mold.

The invention claimed is:

1. A process for production of expanded thermoplastic elastomer beads having an uninterrupted skin, said process comprising;
    a) impregnating a blowing agent into thermoplastic elastomer beads to give impregnated thermoplastic elastomer beads, the thermoplastic elastomer beads being surrounded by a gaseous medium that has an impregnating temperature $T_a$, wherein the absolute pressure of the gaseous medium is greater than ambient pressure, and wherein the thermoplastic elastomer beads are selected from thermoplastic polyester elastomers, thermoplastic copolyamides or thermoplastic polyurethanes, or mixtures thereof,
    b) expanding the impregnated thermoplastic elastomer beads by exposing the thermoplastic elastomer beads to a pressure reduction at a first expanding temperature $T_b$ to give expanded thermoplastic elastomer beads and
    c) optionally a fusing step, wherein the expanded thermoplastic elastomer beads are fused together at a fusing temperature $T_c$ to form at least one shaped part,
        wherein the thermoplastic elastomer beads are made from amorphous thermoplastic elastomer, partly crystalline thermoplastic elastomer, or mixtures thereof, and the impregnating temperature $T_a$, the first expanding temperature $T_b$ and the fusing temperature $T_c$ each depend on the thermoplastic elastomer wherein,
  i. if the thermoplastic elastomer is amorphous, the impregnating temperature $T_a$, the first expanding temperature $T_b$ and the fusing temperature $T_c$ are higher than a first limiting temperature $T_{G-40}$, wherein the first limiting temperature $T_{G-40}$ is 40° C. below the glass transition temperature $T_G$ according to DIN EN ISO 11357-2:2013-09 of the thermoplastic elastomer beads not being impregnated, or
  ii. if the thermoplastic elastomer is partly crystalline, the impregnating temperature $T_a$, the first expanding temperature $T_b$ and the fusing temperature $T_c$ are higher than the glass transition temperature $T_G$ according to DIN EN ISO 11357-2:2013-09 of the nonimpregnated thermoplastic elastomer beads and lower than a second limiting temperature $T_{S-5}$ which is 5° C. below the melting temperature $T_S$ according to DIN EN ISO 11357-3:2013-04 of the thermoplastic elastomer beads not being impregnated.

2. The process according to claim 1, wherein the thermoplastic elastomer beads comprise polyether copolyamides, or thermoplastic polyurethanes, or mixtures thereof.

3. The process according to claim 1, wherein the thermoplastic elastomer beads comprise thermoplastic polyurethanes.

4. The process according to claim 1, wherein the thermoplastic elastomers have an elongation at break, measured to DIN EN ISO 527-2:2012-06, of more than 150%.

5. The process according to claim 1, wherein said impregnating step a) and said expanding step b) are carried out in one apparatus.

6. The process according to claim 1, wherein said impregnating step a), said expanding step b) and said optional fusing step c) are carried out in one apparatus.

7. The process according to claim 1, wherein said first expanding temperature $T_b$ and said fusing temperature $T_c$ are identical, and said expanding step b) and said fusing step c) are carried out simultaneously.

8. The process according to claim 1, wherein the thermoplastic elastomer beads are only partially expanded in expanding step b) and are completely expanded in a further expanding step b2) at a second expanding temperature $T_{b2}$ and wherein said second expanding temperature $T_{b2}$ depends on the thermoplastic elastomer wherein
  I. if the thermoplastic elastomer is amorphous, said second expanding temperature $T_{b2}$ is higher than said first limiting temperature $T_{G-40}$,
  II. if the thermoplastic elastomer is partly crystalline, said second expanding temperature $T_{b2}$ is higher than the glass transition temperature $T_G$ of the nonimpregnated thermoplastic elastomer beads and lower than said second limiting temperature $T_{S-5}$.

9. The process according to claim 8, wherein said impregnating step a) and said expanding step b) of expanding the thermoplastic elastomer beads partially are carried out in a first apparatus and said expanding step b2) of completely expanding the partially expanded thermoplastic elastomer beads is carried out in a second apparatus.

10. The process according to claim 8, wherein said impregnating step a) and said expanding step b) of expanding the thermoplastic elastomer beads partially are carried out in said first apparatus and said expanding step b2) of completely expanding the partially expanded thermoplastic elastomer beads and said fusion step c) are carried out in said second apparatus.

11. The process according to claim 8, wherein said second expanding temperature $T_{b2}$ and said fusing temperature $T_c$ are identical and said further expanding step b2) and said fusing step c) are carried out simultaneously.

12. The process according to claim 1, wherein the blowing agent comprises $CO_2$ or $N_2$, or mixtures thereof.

13. The process according to claim 10, wherein said second expanding temperature $T_{b2}$ and said fusing temperature $T_c$ are identical and said further expanding step b2) and said fusing step c) are carried out simultaneously.

14. The process according to claim 1, wherein the impregnating step is conducted at a pressure from 200 to 1000 bar.

15. The process according to claim 1, wherein the impregnating step is conducted at a pressure from 200 to 700 bar.

16. The process according to claim 1, wherein the impregnating step is conducted at a pressure from 200 to 600 bar.

17. The process according to claim 1, wherein the thermoplastic elastomer beads comprise polyether copolyamides.

18. A process for production of expanded thermoplastic elastomer beads having an uninterrupted skin, said process consisting essentially of;
  a) impregnating a blowing agent into thermoplastic elastomer beads to give impregnated thermoplastic elastomer beads, the thermoplastic elastomer beads being surrounded by a gaseous medium that has an impregnating temperature $T_a$, wherein the absolute pressure of the gaseous medium is greater than ambient pressure, and wherein the thermoplastic elastomer beads are selected from thermoplastic polyester elastomers, thermoplastic copolyamides or thermoplastic polyurethanes, or mixtures thereof,
  b) expanding the impregnated thermoplastic elastomer beads by exposing the thermoplastic elastomer beads to a pressure reduction at a first expanding temperature $T_b$ to give expanded thermoplastic elastomer beads and
  c) optionally a fusing step, wherein the expanded thermoplastic elastomer beads are fused together at a fusing temperature $T_c$ to form at least one shaped part,
    wherein the thermoplastic elastomer beads are made from amorphous thermoplastic elastomer, partly crystalline thermoplastic elastomer, or mixtures thereof, and the impregnating temperature $T_a$, the first expanding temperature $T_b$ and the fusing temperature $T_c$ each depend on the thermoplastic elastomer wherein,
      i. if the thermoplastic elastomer is amorphous, the impregnating temperature $T_a$, the first expanding temperature $T_b$ and the fusing temperature $T_c$ are higher than a first limiting temperature $T_{G-40}$, wherein the first limiting temperature $T_{G-40}$ is 40° C. below the glass transition temperature $T_G$ according to DIN EN ISO 11357-2:2013-09 of the thermoplastic elastomer beads not being impregnated, or
      ii. if the thermoplastic elastomer is partly crystalline, the impregnating temperature $T_a$, the first expanding temperature $T_b$ and the fusing temperature $T_c$ are higher than the glass transition temperature $T_G$ according to DIN EN ISO 11357-2:2013-09 of the nonimpregnated thermoplastic elastomer beads and lower than a second limiting temperature $T_{S-5}$ which is 5° C. below the melting temperature $T_S$ according to DIN EN ISO 11357-3:2013-04 of the thermoplastic elastomer beads not being impregnated.

\* \* \* \* \*